United States Patent [19]

Naradate et al.

[11] Patent Number: 5,084,763

[45] Date of Patent: Jan. 28, 1992

[54] STEREOSCOPIC VIDEO SIGNAL CONVERTING APPARATUS

[75] Inventors: Mitsugi Naradate, Tokyo; Osamu Kaneko, Yokohama, both of Japan

[73] Assignee: Ikegami Tsushinki Co., Ltd., Tokyo, Japan

[21] Appl. No.: 513,669

[22] Filed: Apr. 24, 1990

[30] Foreign Application Priority Data

Apr. 28, 1989 [JP] Japan .................. 1-107722

[51] Int. Cl.⁵ .................. H04N 13/00; H04N 15/00
[52] U.S. Cl. .................. 358/88; 358/3; 358/91; 358/92; 354/112; 354/113; 359/462
[58] Field of Search .................. 358/3, 88, 89, 91, 92; 350/130; 352/57; 354/112, 113

[56] References Cited

U.S. PATENT DOCUMENTS

| | | | |
|---|---|---|---|
| 4,517,592 | 5/1985 | Levy | 358/3 |
| 4,580,173 | 4/1986 | Dischert et al. | 358/12 |
| 4,658,291 | 4/1987 | Morishita | 358/91 |
| 4,743,965 | 5/1988 | Yamada et al. | 358/88 |

Primary Examiner—John K. Peng
Attorney, Agent, or Firm—Spencer & Frank

[57] ABSTRACT

A stereoscopic video signal converting apparatus having A/D converters, field memories, and a D/A converter shared by both the parallel processing system and the time-division multiplex processing system. The shared portions are selectively used for either one of the two systems in accordance with an instruction such as a parallel/time-division multiplex selection signal which selects either one of two types of the read and write pulses for the field memories. A suitable processing system of the two types is selected depending on whether a picture quality or one channel transmission is required without increasing a cost of the apparatus. The apparatus provides compatibility between the two systems so that an operability of the system is enhanced.

7 Claims, 8 Drawing Sheets

STEREOSCOPIC VIDEO SIGNAL CONVERTING APPARATUS

BACKGROUND OF THE INVENTION

1. Field of the Invention

The present invention relates to a stereoscopic video signal converting apparatus which is applicable to a stereoscopic television system.

2. Description of the Prior Art

As a conventional stereoscopic video signal converting apparatus, two types of systems are known in the art.

In a first type system, a parallel processing system, left and right video signals, which respectively correspond to video signals of a picture to be seen by left and right eyes, are separately converted into digital signals by an A/D converter. The digital signals thus converted are then separately stored in separated field memories. The video signals stored in the field memories are separately read out. The video signals read out are converted into analog signals by an D/A converter and then the analog signals are derived therefrom as the signals for stereoscopic display. This parallel processing system has an advantage that it can obtain a high degree of picture quality, because it employs full band components of the video signals and therefore there is no drop-out of the video signals. Such a prior art system is disclosed in FIGS. 3 and 11 of U.S. Pat. No. 4,562,463, which is incorporated by reference into this specification.

In a second type system, a sequential processing system, left and right video signals are time-division multiplexed by alternately switching the left and right video signals at every field. The video signals thus time-division multiplexed are converted sequentially into digital signals by an A/D converter and then the digital signals are stored in field memories. The video signals stored in the field memories are read out and then converted into analog signals by a D/A converter. The analog signals are derived therefrom as the signal permitting stereoscopic display. A picture quality of the second type system is degraded with regard to vertical and motion resolutions in comparison with those of the first type system due to partial drop-out in each field of the left and right video signals. However, the second type system has advantage that it can be constructed of one train of a video transmission system, a VTR, a video switcher and a video editor. This is because the video signals are multiplexed in one channel, and multiplexing by field switching is simple and economically arranged. Such a prior art system is disclosed in FIGS. 2 and 12 of U.S. Pat. No. 4,562,463.

However, the above-described two systems are less flexible, since each of the systems is limited in use. That is, one of the systems must be used if picture quality is required, whereas the other system must be used if simplification of transmission is required.

SUMMARY OF THE INVENTION

In view of the foregoing, an object of the present invention is to provide a stereoscopic video signal converting apparatus which is so arranged to select a suitable operation mode depending on whether or not a picture quality has a priority over simplification of transmission system or vice versa.

In a first aspect of the present invention, a stereoscopic video signal converting apparatus for converting a left video signal for a left eye and a right video signal for a right eye picked up with binocular parallax into a stereoscopic video signal for stereoscopic display, comprises:

selecting means for selectively outputting one of parallel input signals having the left and right video signals and a multiplexed input signal having the left and right video signals which are time-division multiplexed to each other by switching the left and right video signals at every field;

A/D converting means for converting output signals from the select means into digital video signals;

a plurality of field memories connected to the output side of the A/D converting means;

write controlling means for producing write pulses for writing, in sequence, the digital video signals from the A/D converting means into the plurality of field memories at every field in accordance with a predetermined writing sequence;

read controlling means for producing read pulses for reading out, in sequence, the digital video signals stored in the plurality of field memories at every field in accordance with a predetermined reading sequence;

D/A converting means for converting digital video signals read out from the plurality of field memories into analog video signals; and means for controlling the write controlling means and the read controlling means in response to the selection of either of the parallel input signals and the multiplexed input signal, thereby the write controlling means producing the write pulses in conformity with the selection and the read controlling means producing the read pulses in conformity with the selection.

Here, the write controlling means, the read controlling means and the means for controlling integrally may comprise:

a field timing memory for storing two types of read and write pulses for the parallel input signals and the multiplexed input signal, the field timing memory being controlled by a parallel/time-division multiplex selection signal to select either one of the two types of read and write pulses;

a synchronizing signal generator for producing a synchronizing signal; and a field counter for producing a clock pulse for clocking out the selected read and write pulses from field timing memory.

The selecting means may comprise BNC connectors selectively receiving the parallel input signals and the multiplexed input signal.

The selecting means may comprise a selection switch for selectively supplying either one of the parallel input signals and the multiplexed input signal to one of the A/D converting means in accordance with a parallel/-time-division multiplex selection signal, and the other of the parallel input signals may be supplied directly to the A/D converting means.

In the second present invention, a stereoscopic video signal converting apparatus for converting a left video signal for a left eye and a right video signal for a right eye picked up with binocular parallax into a stereoscopic video signal for stereoscopic display, comprises:

A/D converting means for converting analog input video signals, which are either one of parallel input signals having the left and right video signals and a multiplexed input signal having the left and right video signals which are time-division multiplexed to each other by switching the left and right video signals at every field, into digital video signals;

selecting means for selectively outputting the digital video signals corresponding to either one of the parallel input signals and the multiplexed input signal;

a plurality of field memories connected to an output side of the selecting means;

write controlling means for producing write pulses for writing, in sequence, the digital video signals from the selecting means into the plurality of field memories at every field in accordance with a predetermined writing sequence;

read controlling means for producing read pulses for reading out, in sequence, the digital video signals stored in the plurality of field memories at every field in accordance with a predetermined reading sequence;

D/A converting means for converting digital video signals read out from the plurality of field memories into analog video signals; and means for controlling the write controlling means and the read controlling means in response to the selection of either of the parallel input signals and the multiplexed input signal, thereby the write controlling means producing the write pulses in conformity with the selection and the read controlling means producing the read pulses in conformity with the selection.

Here, the write controlling means, the read controlling means and the means for controlling integrally may comprise:

a field timing memory storing two types of read and write pulses for the parallel input signals and the multiplexed input signal, the field timing memory being controlled by a parallel/time-division multiplex selection signal to select either one of the two types of read and write pulses;

a synchronizing signal generator for producing a synchronizing signal; and a field counter for producing a clock pulse for clocking out the the selected read and write pulses from field timing memory.

The selecting means may comprise a selection switch for selectively supplying either one of one of the digital video signals corresponding to the parallel input signals and the digital video signals corresponding to the multiplexed input signal from the A/D converting means to the plurality of field memories, and the other of the digital video signals corresponding to the parallel input signals may be supplied directly to the plurality of field memories.

In the present invention, the A/D converter, the field memories, and the D/A converter are shared so that the switching between the two types of systems for obtaining signals for stereoscopic display is possible. Accordingly, there is no substantial cost increase in the present invention.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
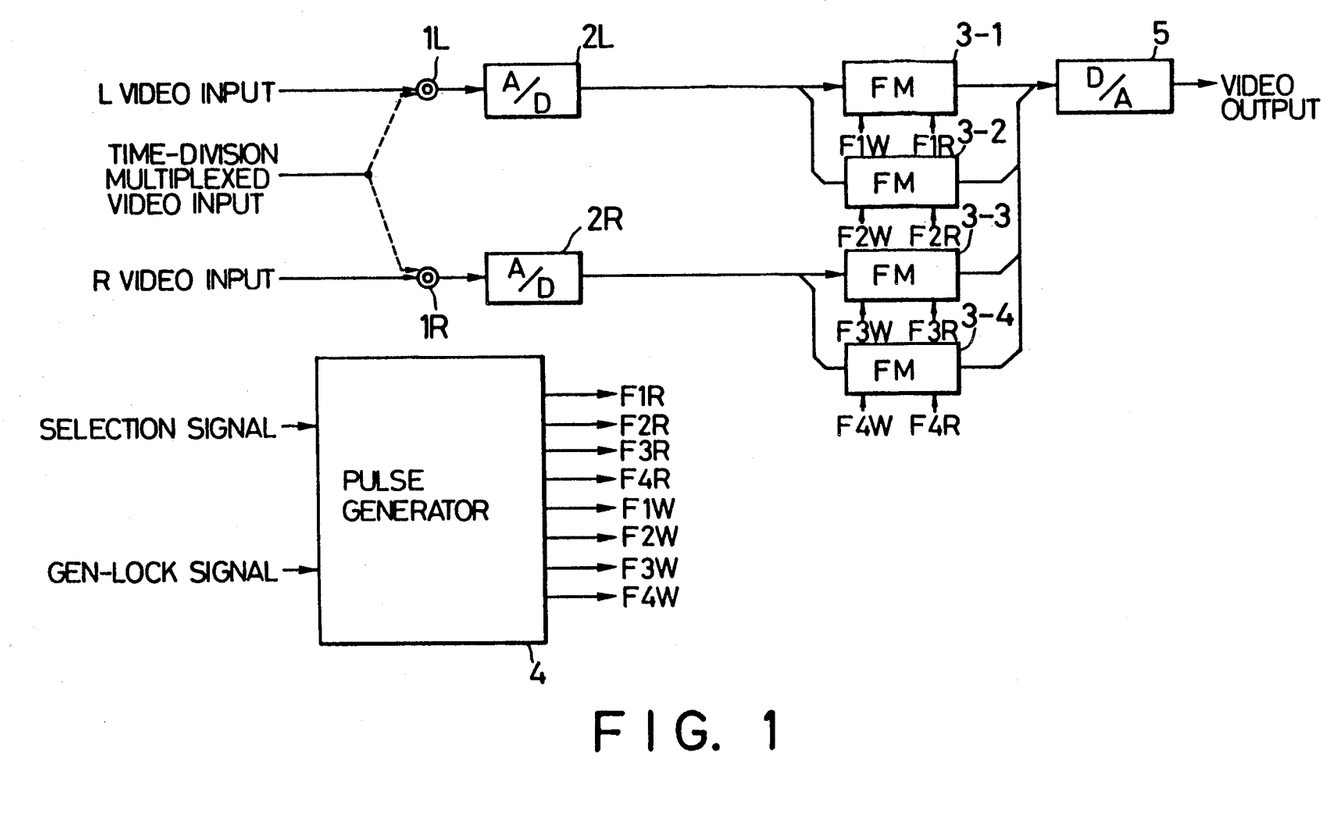
FIGS. 1, 2 and 3 are block diagrams showing three embodiments of a stereoscopic video signal converting apparatus in accordance with the present invention.

FIG. 1 is a block diagram showing an embodiment of a stereoscopic video signal converting system according to the present invention.

In FIG. 1, reference numerals 1L and 1R denote left and right channel BNC connectors, respectively, for receiving input video signals (for example, left and right channel video input signals or a time-division multiplexed video input signal). The connectors 1L and 1R are connected to analog-to-digital (A/D) converters 2L and 2R, respectively. The digital output signal from the A/D converter 2L is applied to first and second field memories 3-1 and 3-2. The digital output from the A/D converter 2R is applied to third and fourth field memories 3-3 and 3-4. The write and read timings of the four field memories 3-1, 3-2, 3-3 and 3-4 are controlled by write signals F1W, F2W, F3W and F4W and read signals F1R, F2R, F3R and F4R from a pulse generator 4. A detailed arrangement of the pulse generator 4 will be explained with reference to FIG. 4 later. The signals read out from the field memories 3-1, 3-2, 3-3 and 3-4 according to the timing of the read signals F1R, F2R, F3R and F4R are converted into an analog signal by a digital-to-analog (D/A) converter 5 to obtain an analog video output signal having a field rate of 120 Hz.

The circuit arrangement shown in FIG. 1 is adaptable to either of the two systems (parallel or sequential processing systems) described above for obtaining signals for stereoscopic display by changing input connections to the BNC connectors 1L and 1R. That is, in the case of the parallel processing system, a left video signal having a field rate of 60 Hz is supplied (by a user) to the BNC connector 1L and a right video signal having a field rate of 60 Hz is supplied (by a user) to the BNC connector 1R. In the case of a video signal obtained by time-division multiplexing by alternately switching the left video signal and the right video signal at each field having a field rate of 60 Hz, the video signal is connected to both of the L BNC connector 1L and the R BNC connector 1R (by a user). A parallel/time-division selection signal applied to the pulse generator 4 is switched (by a user) depending on which of the user's two types of systems is to be used. According to the selection, the pulse generator 4 generates read and write pulses F1R–F4R and F1W–F4W at timings shown in FIG. 6 or 7, thereby controlling the writing and reading of the field memories 3-1, 3-2, 3-3 and 3-4.

In this embodiment, the two types of systems described above share the A/D converters 2L and 2R, the field memories 3-1, 3-2, 3-3 and 3-4, and the D/A converter 5.

Figure 2:
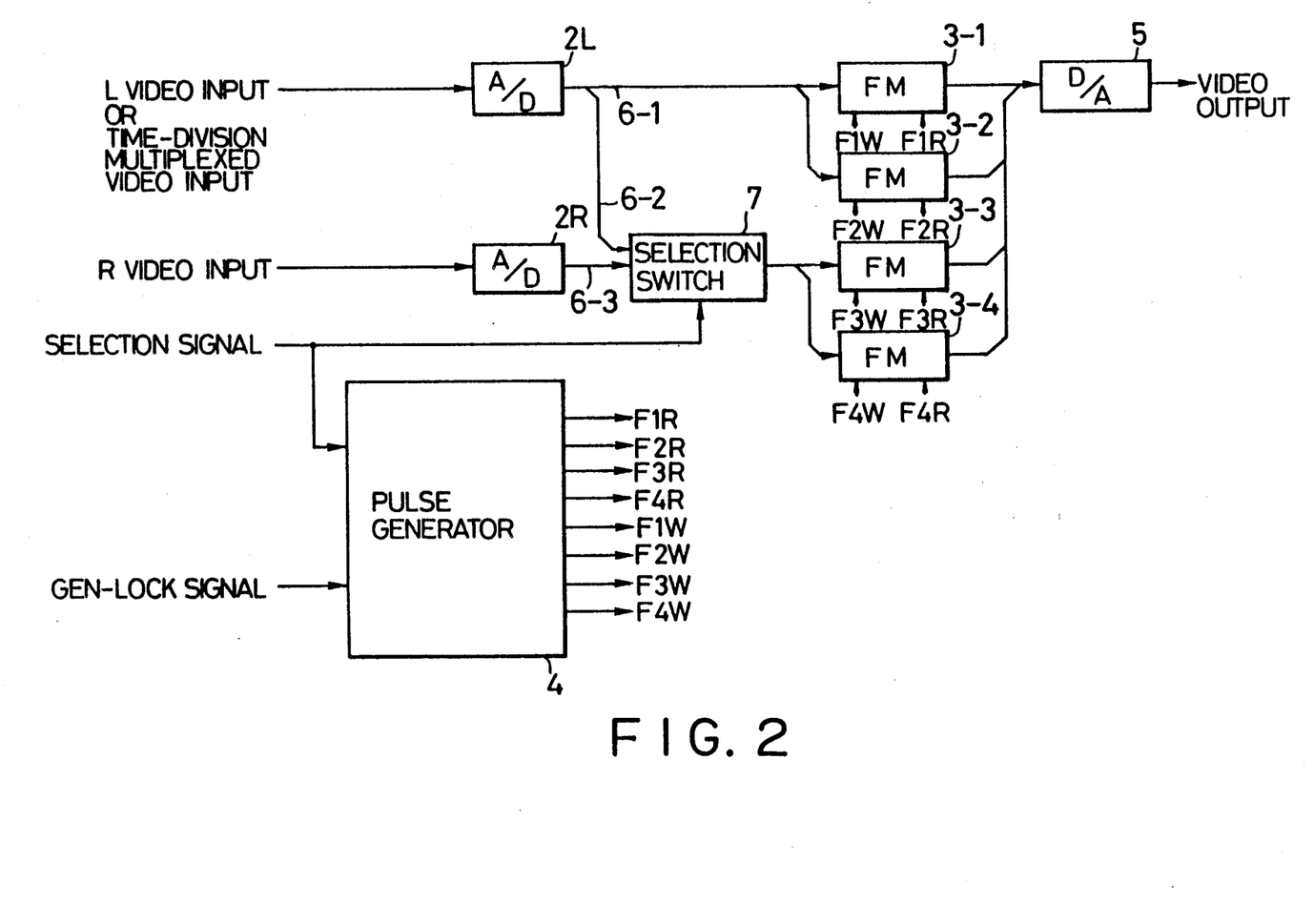

FIG. 2 is a block diagram showing a second embodiment of a stereoscopic video signal converting system according to the present invention.

In FIG. 2, reference numerals 6-1, 6-2 and 6-3 denote data buses between the A/D converter 2L and the field memories 3-1 and 3-2, between the A/D converter 2L and a selection switch 7 and between the A/D converter 2R and the selection switch 7. The selected output from the selection switch 7 is applied to the field memories 3-3 and 3-4. The selection switch 7 selects the digital signal either on the data bus 6-1 or 6-3 according to the parallel/time-division multiplex selection signal applied to the switch 7. In the arrangement shown in FIG. 2, the connectors 1L and 1R shown in FIG. 1 are omitted. The left channel video input signal or time-division multiplexed video input signal is supplied to the A/D converter 2L. The right channel video input signal is supplied to the A/D converter 2R.

In this embodiment, the signals from the A/D converters 2L and 2R and on the data buses 6-2 and 6-3 are selectively derived from the selecting switch 7 depending on which of the two types of systems described above are selected.

In the case of the parallel processing, the data bus 6-2 is disabled. Accordingly, the left channel video signal is applied to the field memories 3-1 and 3-2 through the data bus 6-1, while the right channel video signal is supplied to the field memories 3-3 and 3-4 through the data bus 6-3 and the switch 7. In the case of the sequential processing, the data bus 6-3 is disabled. The time-division multiplexed video signal is supplied to the field memories 3-1 and 3-2 through the data bus 6-1 and also to the field memories 3-3 and 3-4 through the data bus 6-2 and the switch 7.

Figure 3:
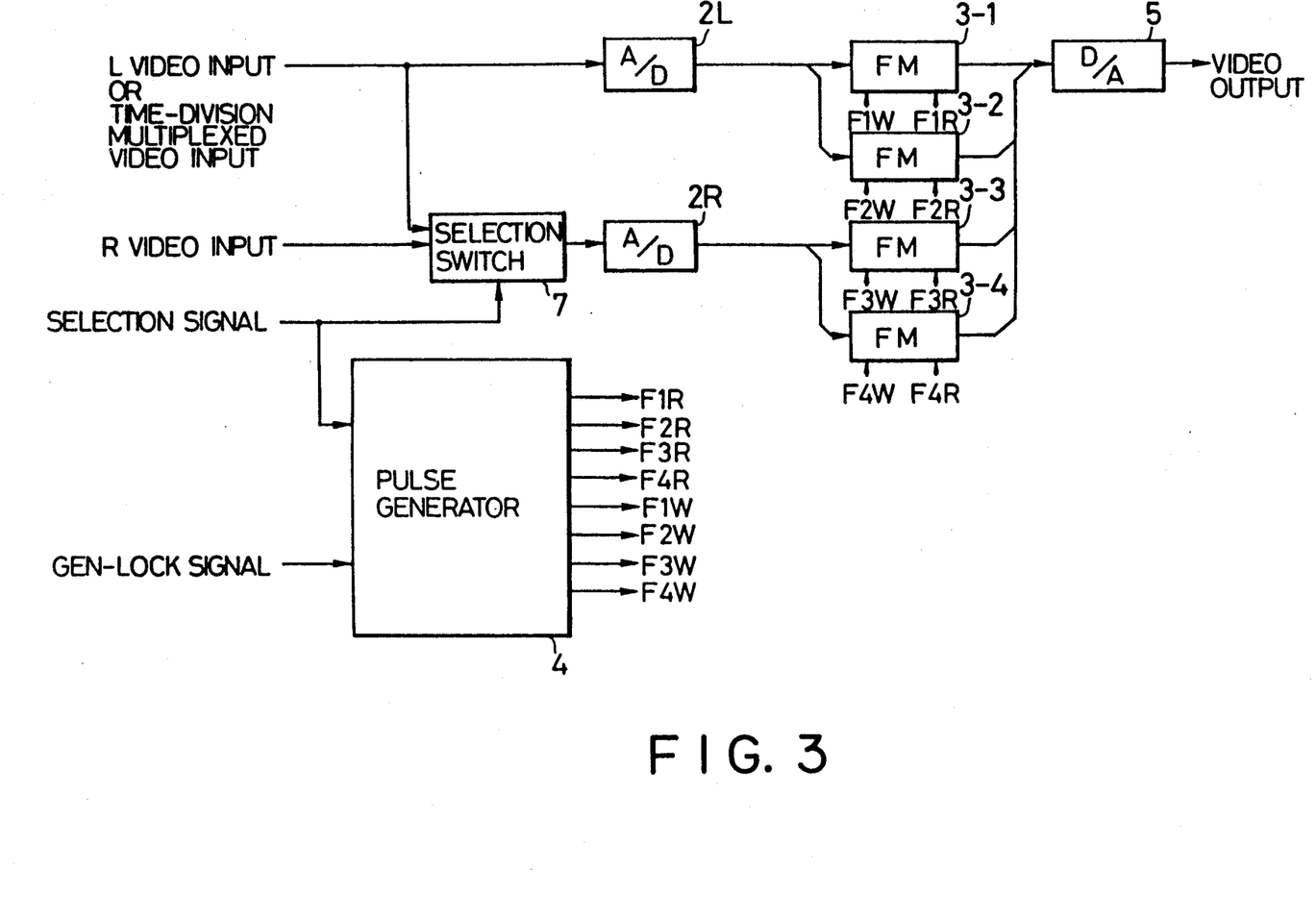

FIG. 3 is a block diagram showing a third embodiment of a stereoscopic video signal converting system according to the present invention.

In FIG. 3, a selection switch 7 is arranged in front of the A/D converter 2R. This, the L channel video input signal or time-division multiplex video input signal is applied to the A/D converter 2L and the selection switch 7. The R channel video input signal is applied to the selection switch 7. The output from the switch 7 is applied to the A/D converter 2R. The output from the A/D converter 2L is applied to the field memories 3-1 and 3-2. The output from the A/D converter 2R is applied to the field memories 3-3 and 3-4.

In this embodiment, the selection of video signal data between the two types of systems is performed by the selection switch 7 provided in the preceding stage of the A/D converter 2R. The selected analog signals are then converted into digital signals by the A/D converters 2L and 2R.

Figure 4:
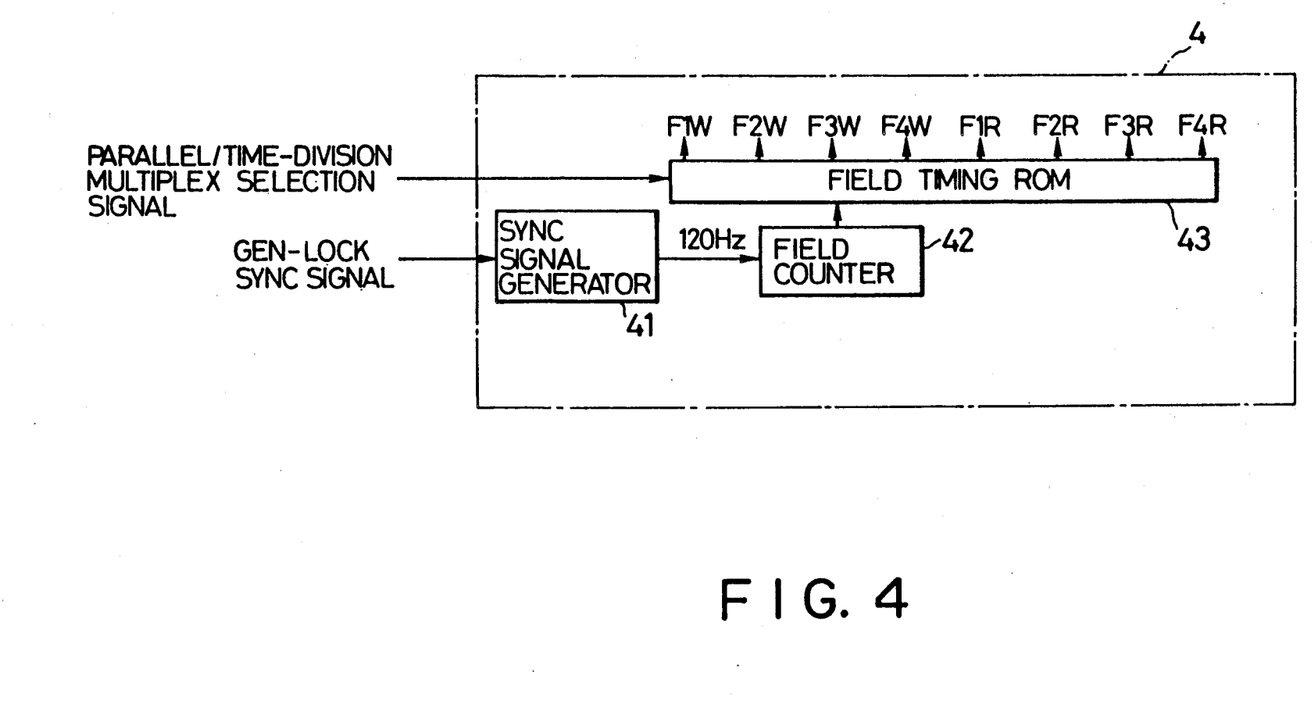
FIG. 4 is a block diagram showing one embodiment of a circuit for generating read/write timing signals for the field memories shown in FIGS. 1–3.

FIG. 4 is a block diagram showing an embodiment of the pulse generator 4 shown in FIG. 1.

In FIG. 4, the pulse generator 4 has a synchronizing signal generator 41 receiving a generator-lock (gen-lock) synchronizing signal to generate a synchronizing signal having a frequency of 120 Hz and locked to the gen-lock synchronizing signal. The synchronizing signal from the generator 41 is supplied to a field counter 42. Reference numeral 43 denotes a field timing ROM for producing read pulses F1R-F4R and write pulses F1W-F4W for the field memories 3-1, 3-2, 3-3 and 3-4 in response to the output from the field counter 42, which operates at a speed of 120 Hz, twice the speed of 60 Hz. The ROM 43 stores two types of the read and write pulse, i.e., one type for the parallel processing and the other type for the time-division multiplex processing. Either one of the two types of the read and write pulses is selected by the parallel/time-division multiplex selection signal.

Figure 5:
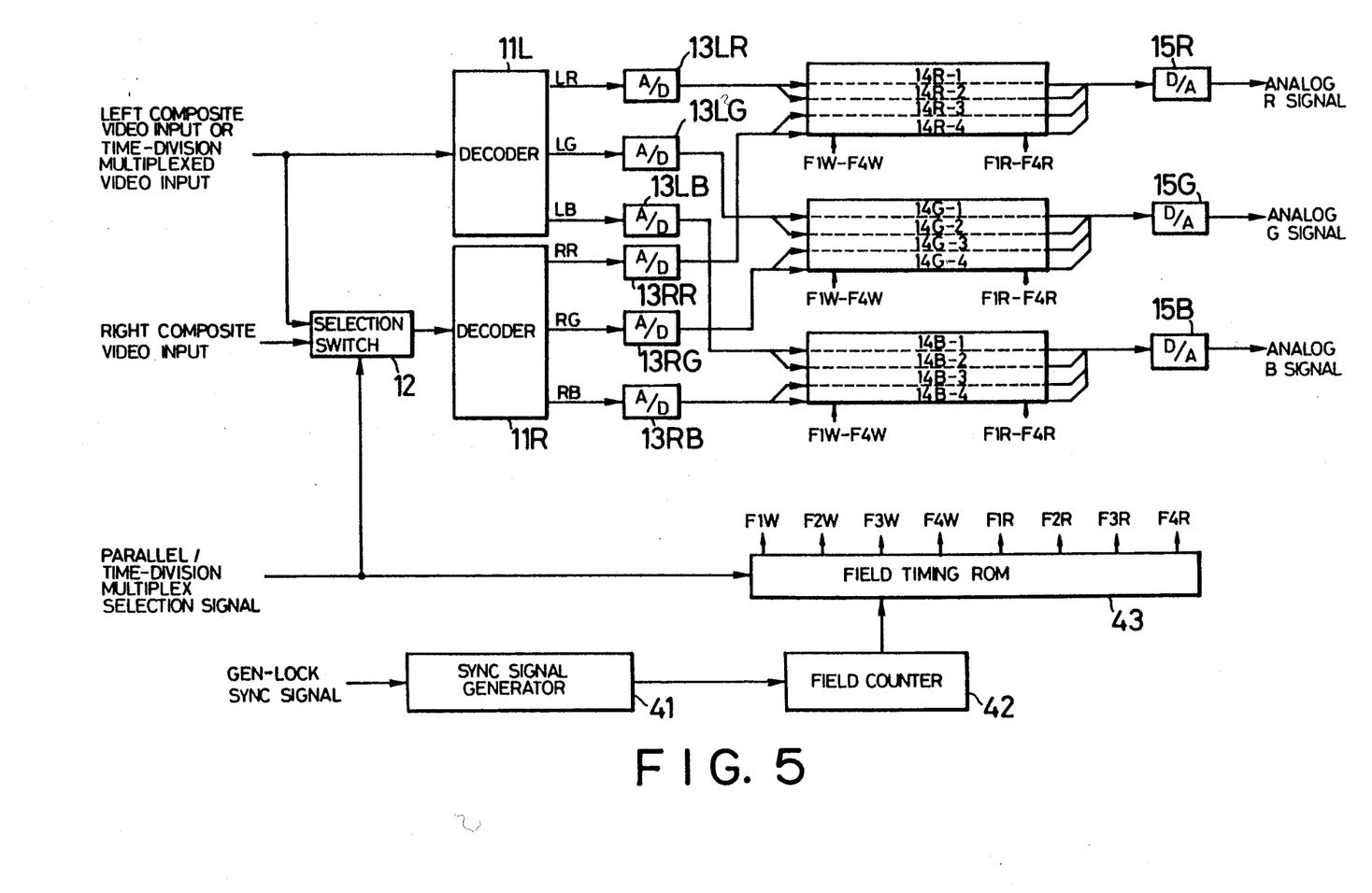
FIG. 5 is a block diagram showing another embodiment of the present invention.

FIG. 5 is a block diagram showing the fourth embodiment of a stereoscopic video signal converting system according to the present invention.

In FIG. 5, a left composite video input signal having a field rate of 60 Hz or a time-division multiplexed video input signal having a field rate of 60 Hz is applied to a decoder 11L and to a selection switch 12. A right composite video input signal having a field rate of 60 Hz is applied to a decoder 11R via the selection switch 12. The switch 12 is controlled by the parallel/time-division multiplex selection signal to selectively output either one of the time-division multiplexed video input signal and the right composite video input signal. The decoders 11L and 11R output component video signals LR, LG and LB and RR, RG and RB, respectively, which are applied to A/D converters 13LR, 13LG and 13LB and 13RR, 13RG and 13RB, respectively. The digital output signals from the A/D converters 13LR and 13RR are applied to field memories 14R-1 and 14R-2, and 14R-3 and 14R-4, respectively. The digital output signals from the A/D converters 13LG and 13RG are applied to field memories 14G-1 and 14G-2, and 14G-3 and 14G-4, respectively. The digital output signals from the A/D converters 13LB and 13RB are applied to field memories 14B-1 and 14B-2, and 14B-3 and 14B-4, respectively. The write and read timings of the field memories 14R-1, ——, 14R-4; 14G-1, ——, 14G-4; and 14B-1, ——, 14B-4 are controlled by the write and read pulses F1W-F4W and F1R-F4R from the field timing ROM 43. The signals read out from the field memories 14R-1, ——, 14R-4; 14G-1, ——, 14G-4; and 14B-1, ——, 14B-4 are supplied to D/A converters 15R, 15G and 15B, respectively, to output analog R, G and B signals, each having a field rate of 60 Hz.

In this embodiment, the video signal conversion is performed separately by the respective R, G, and B components of the left and right video signals. The two decoders 11L and 11R convert the composite video input signals into the R, G, and B component video signals. The selection of either one of the two types of systems can be performed simply by the selection switch 12 for analog video signals provided in the preceding stage of the decoder 11R. The switching in the field timing ROM 43 is interlocked with the selection between the two types of systems.

Figure 6:
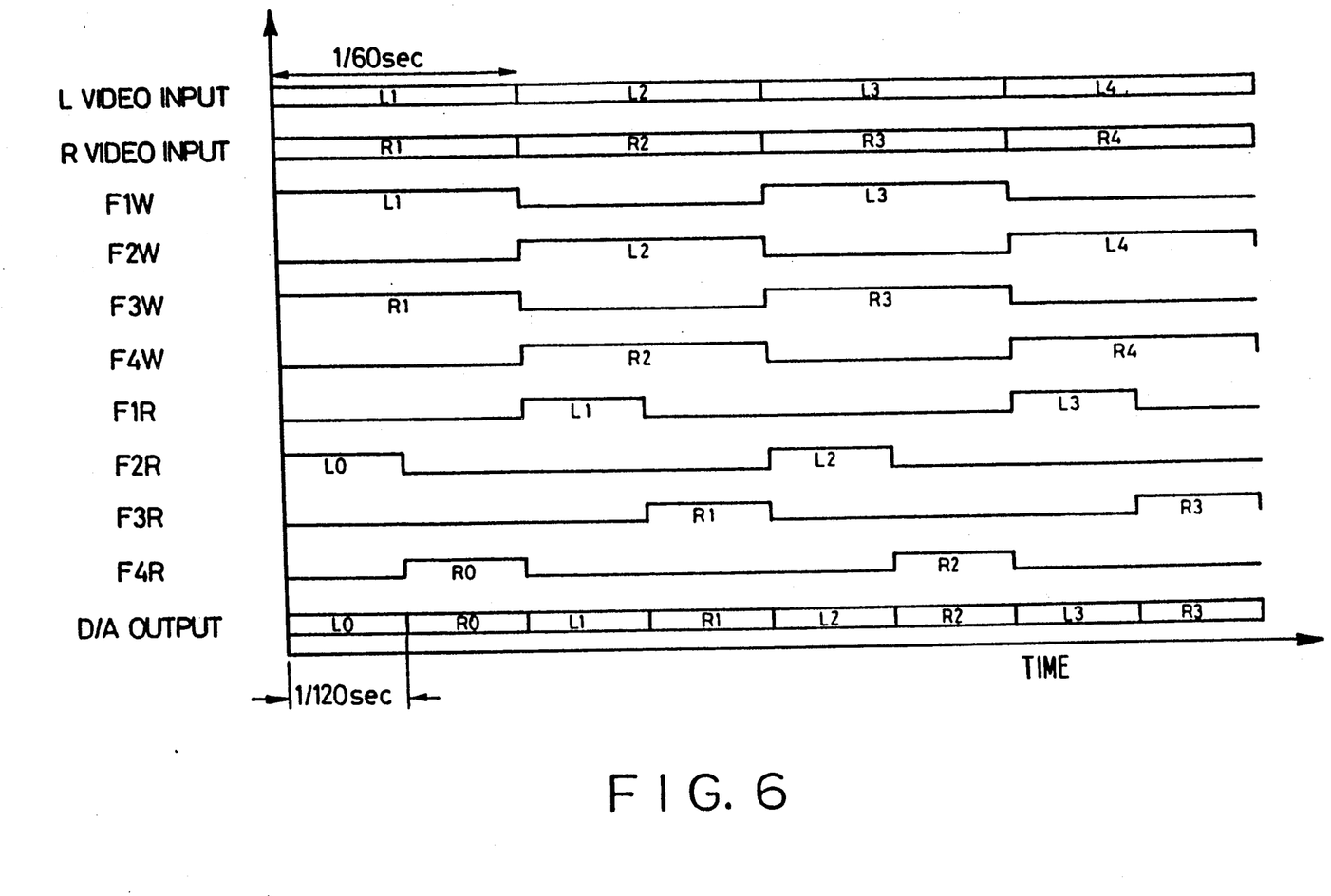
FIGS. 6 and 7 are timing charts for explaining respective operations of the embodiments of the present invention.

FIG. 6 illustrates an example of timings of the write pulses F1W-F4W and the read pulses F1R-F4R in the case of the parallel processing system in which each of the left and right video input signals are separately written into the respective field memories by the sequence of the write pulses F1W-F4W illustrated in FIG. 6.

Figure 7:
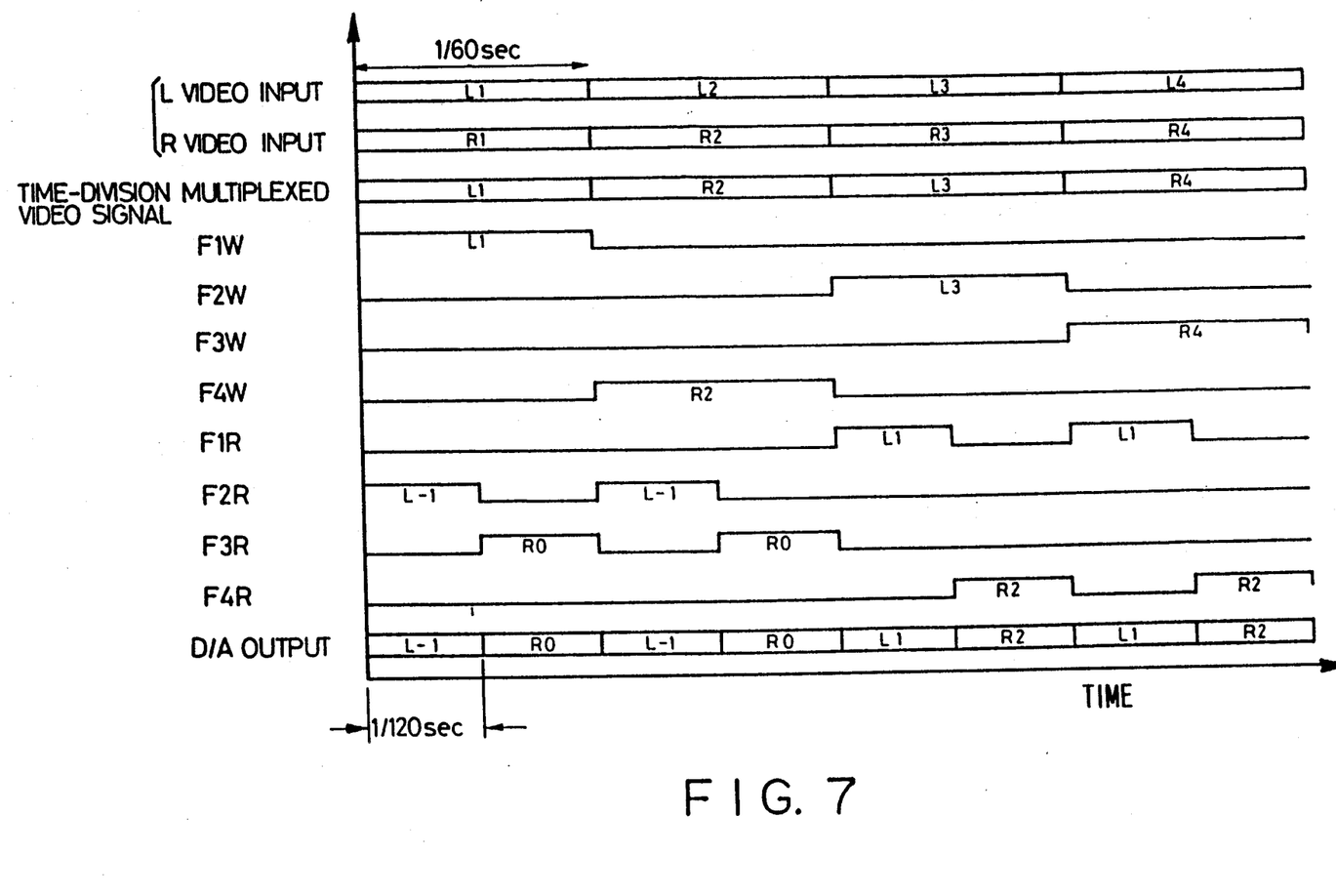

FIG. 7 illustrates an example of timings of the write pulses F1W-F4W and the read pulses F1R-F4R in the case of the time-division multiplex processing system in which the left and right video input signals are sequentially time-division multiplexed by switching the left and right video input signals at every field by the sequence of the write pulses F1W-F4W illustrated in FIG. 7.

Figure 8:
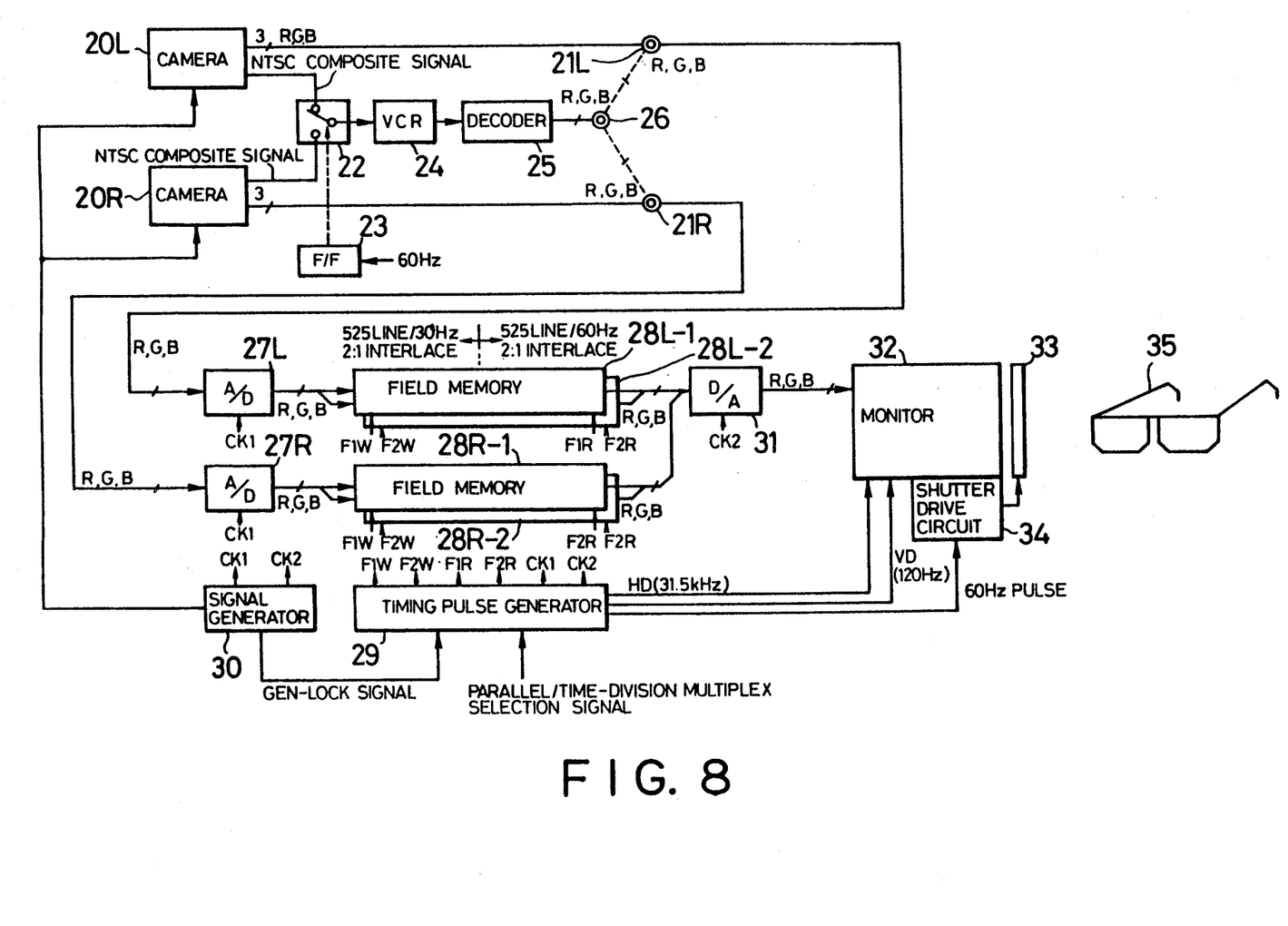
FIG. 8 is a block diagram showing further embodiment of the present invention.

FIG. 8 is a block diagram showing the fifth embodiment of a stereoscopic video signal converting system according to the present invention.

In FIG. 8, reference numerals 20L and 20R denote left and right television cameras. The left and right R, G and B signals from the cameras 20L and 20R are applied to BNC connectors 21L and 21R, respectively. The NTSC composite signals from the cameras 20L and 20R are applied to a switch 22 controlled by a flip-flop 23 clocked by a 60 Hz pulse, so that the left and right NTSC composite signals are time-division multiplexed to form a serial signal. The serial or time-division multiplexed signal is transferred to a VCR (VTR) unit 24 and a decoder 25 in this sequence to obtain R, G and B signals, which is applied to a BNC connector 26 which can be connected to the connectors 21L and 21R when the sequential or time-division multiplex processing is required.

The R, G and B signals at the connectors 21L and 21R are supplied to left and right A/D converters 27L and 27R. The left and right digital R, G and B signals from the A/D converters 27L and 27R are supplied to left field memories 28L-1 and 28L-2 and right field memories 28R-1 and 28R-2, respectively. The read and write timings of the field memories 28L-1, 28L-2, 28R-1 and 28R-2 are controlled by the read pulses F1R and F2R and write pulses F1W and F2W produced by a timing pulse generator 29, which receives a generator-locked (gen-lock) signal from a signal generator 30. The signal generator 30 also generates another gen-lock signal to be supplied to the cameras 20L and 20R.

The timing pulse generator 29 also receives the parallel/time-division multiplex selection signal to select either one of the parallel processing and the time-division multiplex processing when the read and write pulses are generated. At the same time, the connection to the connectors 21L and 21R from the connector 26 is changed depending upon which processing is selected.

The R, G and B signals read out from the field memories 28L-1, 28L-2, 28R-1 and 28R-2 are applied to a D/A converter 31. Here, the frequency of a clock pulse CK2 applied to the D/A converter 31 is twice that of a clock pulse CK1 applied to the A/D converters 27L and 27R. It is to be noted that the R, G and B signals written into the field memories 28L-1, 28L-2, 28R-1 and 28R-2 are in the format of 525 lines/30 Hz and 2:1 interlace, while the R, G and B signals read out from the field memories 28L-1, 28L-2, 28R-1 and 28R-2 are in the format of 525 lines/60 Hz and 2:1 interlace.

The analog R, G and B output signals from the D/A converter 31 is applied to a monitor 32 in which a field rate is 120 Hz. The monitor 32 receives an HD pulse of 31.5 kHz and a VD pulse of 120 Hz from the timing pulse generator 29. Reference numeral 33 denotes a liquid crystal shutter arranged in front of the monitor screen of the monitor 32. The shutter 33 is controlled by a shutter drive circuit 34 which receives a 60 Hz pulse from the timing pulse generator 29 to drive the shutter 33 in a manner that a stereoscopic picture can be observed through polarized eyeglasses 35. In other words, the shutter 33 is switched every 1/120 seconds.

When a color stereoscopic picture is displayed by the parallel processing, the connectors 21L and 21R are connected to the cameras 20L and 20R and the timing pulse generator 29 selects the read and write pulses for the parallel processing system. When a color stereoscopic picture is displayed by the time-division multiplex processing system, NTSC composite signals produced by the two cameras 20L and 20R are converted into a serial type of signal time-division multiplexing the NTSC composite signals by the switch 22. The serial signal is converted into the R, G and B signals through the VCR 24 and the decoder 25, and then the R, G and B signals are inputted to the respective A/D converters 27L and 27R via the connector 26 and the connectors 21L and 21R.

Further, the present invention is applicable to any desired field frequency such as 50 Hz by changing a field rate.

According to the present invention, it is possible to select one of the two operation modes or systems depending on whether picture quality or simplification of transmission system is required by sharing the A/D converters, field memories, and D/A converters and without increasing the cost of the system. Furthermore, the system according to the present invention is compatible with both of the others two systems so that an operability of the system can be improved.

The invention has been described in detail with respect to preferred embodiments, and it will now be apparent from the foregoing to those skilled in the art that changes and modifications may be made without departing from the invention in its broader aspects, and it is the invention, therefore, as recited in the appended claims and cover all such changes and modifications as fall within the true spirit of the invention.

What is claimed is:

1. A stereoscopic video signal converting apparatus for converting a left video signal for a left eye and a right video signal for a right eye picked up with binocular parallax into a stereoscopic video signal for stereoscopic display, comprising:

selecting means for selectively outputting one of parallel input signals having said left and right video signals and a multiplexed input signal having said left and right video signals which are time-division multiplexed to each other by switching said left and right video signals at every field;

A/D converting means for converting output signals from said selecting means into digital video signals;

a plurality of field memories connected to the output side of said A/D converting means;

write controlling means for producing write pulses for writing, in sequence, said digital video signals from said A/D converting means into said plurality of field memories at every field in accordance with a predetermined writing sequence;

read controlling means for producing read pulses for reading out, in sequence, the digital video signals stored in said plurality of field memories at every field in accordance with a predetermined reading sequence;

D/A converting means for converting digital video signals read out from said plurality of field memories into analog video signals; and means for controlling said write controlling means and said read controlling means in response to the selection of either of said parallel input signals and said multiplexed input signal, thereby said write controlling means producing the write pulses in conformity with said selection and said read controlling means producing the read pulses in conformity with said selection.

2. A stereoscopic video signal converting apparatus as claimed in claim 1, wherein said write controlling means, said read controlling means and said means for controlling integrally comprise:

a field timing memory for storing two types of read and write pulses for said parallel input signals and said multiplexed input signal, said field timing memory being controlled by a parallel/time-division multiplex selection signal to select either one of said two types of read and write pulses;

a synchronizing signal generator for producing a synchronizing signal; and a field counter for producing a clock pulse for clocking out the read and write pulses selected by said field timing memory.

3. A stereoscopic video signal converting apparatus as claimed in claim 1, wherein said selecting means comprises BNC connectors selectively receiving said parallel input signals and said multiplexed input signal.

4. A stereoscopic video signal converting apparatus as claimed in claim 1, wherein said selecting means comprises a selection switch for selectively supplying either one of said parallel input signals and said multiplexed input signal to one of said A/D converting means in accordance with a parallel/time-division multiplex selection signal, and for supplying the other of said parallel input signals directly to said A/D converting means.

5. A stereoscopic video signal converting apparatus for converting a left video signal for a left eye and a right video for a right eye picked up with binocular parallax into a stereoscopic video signal for stereoscopic display, comprising:
   A/D converting means for converting analog input video signals, which are either one of parallel input signals having said left and right video signals and a multiplexed input signal having said left and right video signals which are time-division multiplexed to each other by switching said left and right video signals at every field, into digital video signals;
   selecting means for selectively outputting said digital video signals corresponding to either one of said parallel input signals and said multiplexed input signal;
   a plurality of field memories connected to an output side of said selecting means;
   write controlling means for producing write pulses for writing, in sequence, said digital video signals from said selecting means into said plurality of field memories at every field in accordance with a predetermined writing sequence;
   read controlling means for producing read pulses for reading out, in sequence, the digital video signals stored in said plurality of field memories at every field in accordance with a predetermined reading sequence;
   D/A converting means for converting digital video signals read out from said plurality of field memories into analog video signals; and
   means for controlling said write controlling means and said read controlling means in response to the selection of either of said parallel input signals and said multiplexed input signal, thereby said write controlling means producing the write pulses in conformity with said selection and said read controlling means producing the read pulses in conformity with said selection.

6. A stereoscopic video signal converting apparatus as claimed in claim 5, wherein said write controlling means, said read controlling means and said means for controlling integrally comprise:
   a field timing memory for storing two types of read and write pulses for said parallel input signals and said multiplexed input signal, said field timing memory being controlled by a parallel/time-division multiplex selection signal to select either one of said two types of read and write pulses;
   a synchronizing signal generator for producing a synchronizing signal; and
   a field counter for producing a clock pulse for clocking out the read and write pulses selected by said field timing memory.

7. A stereoscopic video signal converting apparatus as claimed in claim 5, wherein said selecting means comprises a selection switch for selectively supplying either one of one of said digital video signals corresponding to said parallel input signals and said digital video signals corresponding to said multiplexed input signal from said A/D converting means to said plurality of field memories, and for supplying the other of said digital video signals corresponding to said parallel input signals directly to said plurality of field memories.

* * * * *